Figure 8:
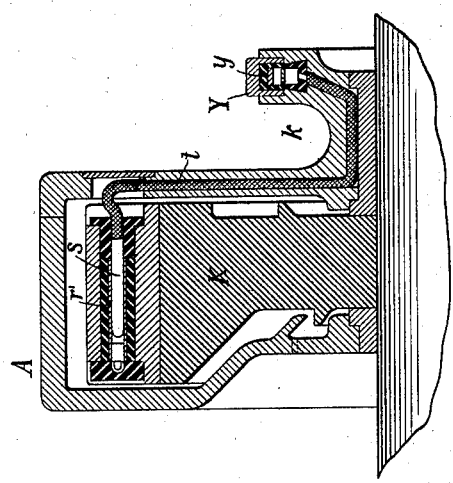
Figure 9:
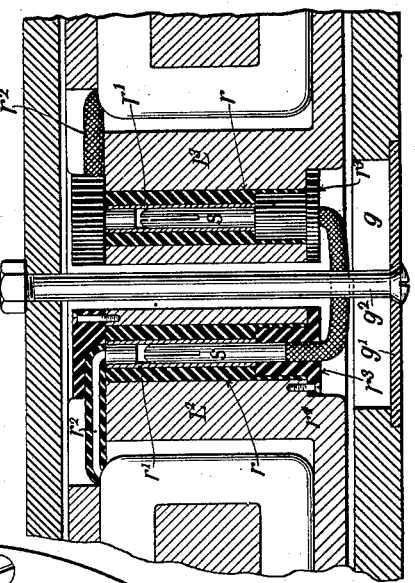

No. 750,422. PATENTED JAN. 26, 1904.
G. C. ANTHON.
ELECTRIC BRAKE.
APPLICATION FILED APR. 11, 1902.
NO MODEL. 5 SHEETS—SHEET 1.
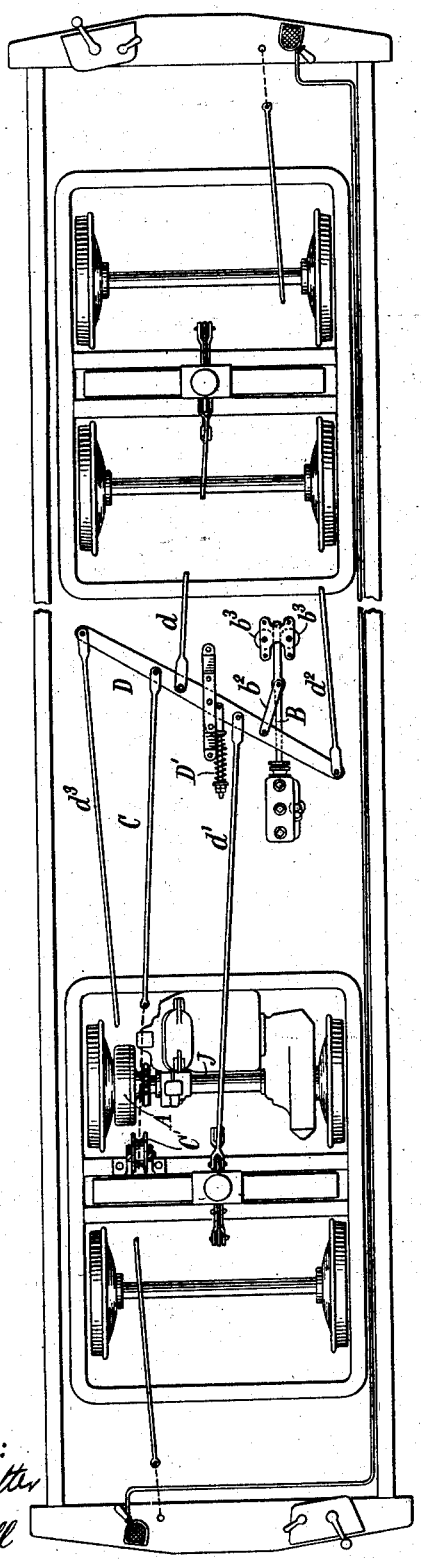
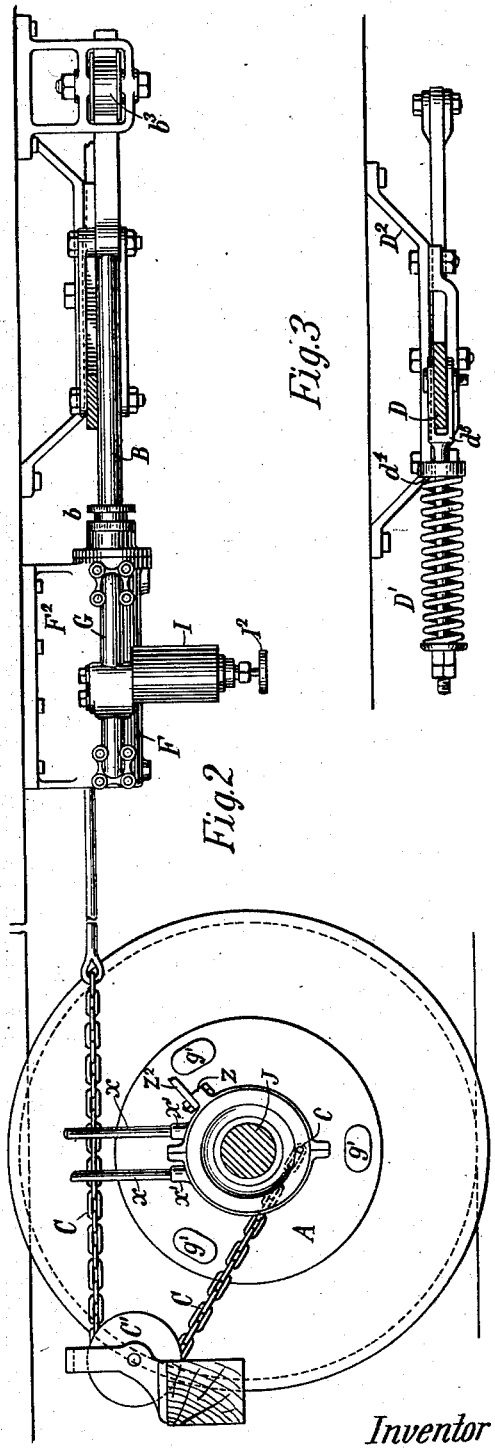
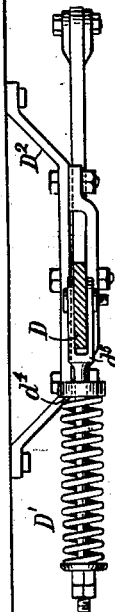
Witnesses:
Raphaël Netter
C. D. Morrill
Inventor
George C. Anthon
by E. M. Bentley Att'y

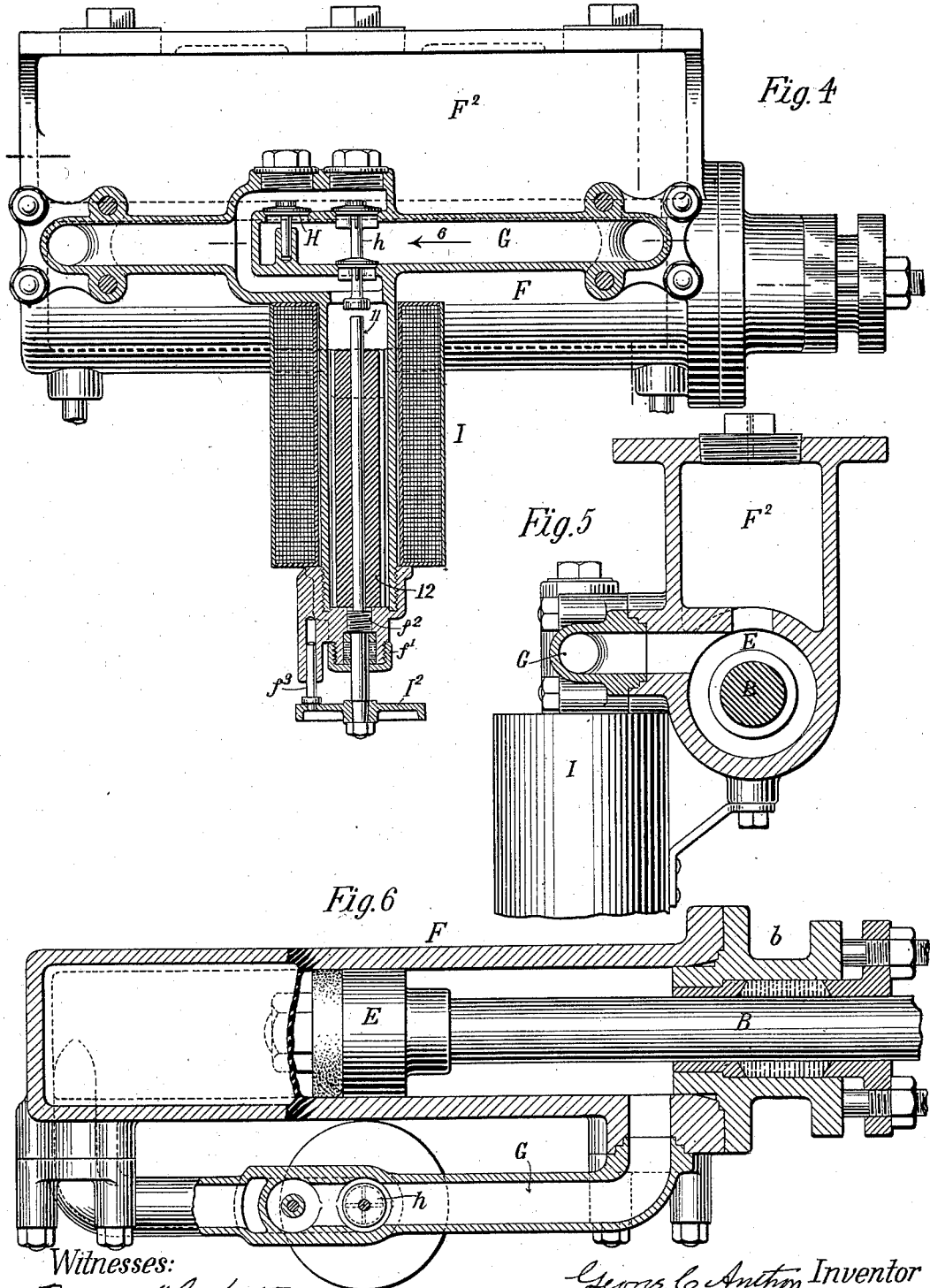

No. 750,422. PATENTED JAN. 26, 1904.
G. C. ANTHON.
ELECTRIC BRAKE.
APPLICATION FILED APR. 11, 1902.
NO MODEL. 5 SHEETS—SHEET 3.

Witnesses:
Raphael Netter
C. D. Morrill

Inventor
George C. Anthon
by E. M. Bentley Att'y

No. 750,422. PATENTED JAN. 26, 1904.
G. C. ANTHON.
ELECTRIC BRAKE.
APPLICATION FILED APR. 11, 1902.
NO MODEL. 5 SHEETS—SHEET 4.
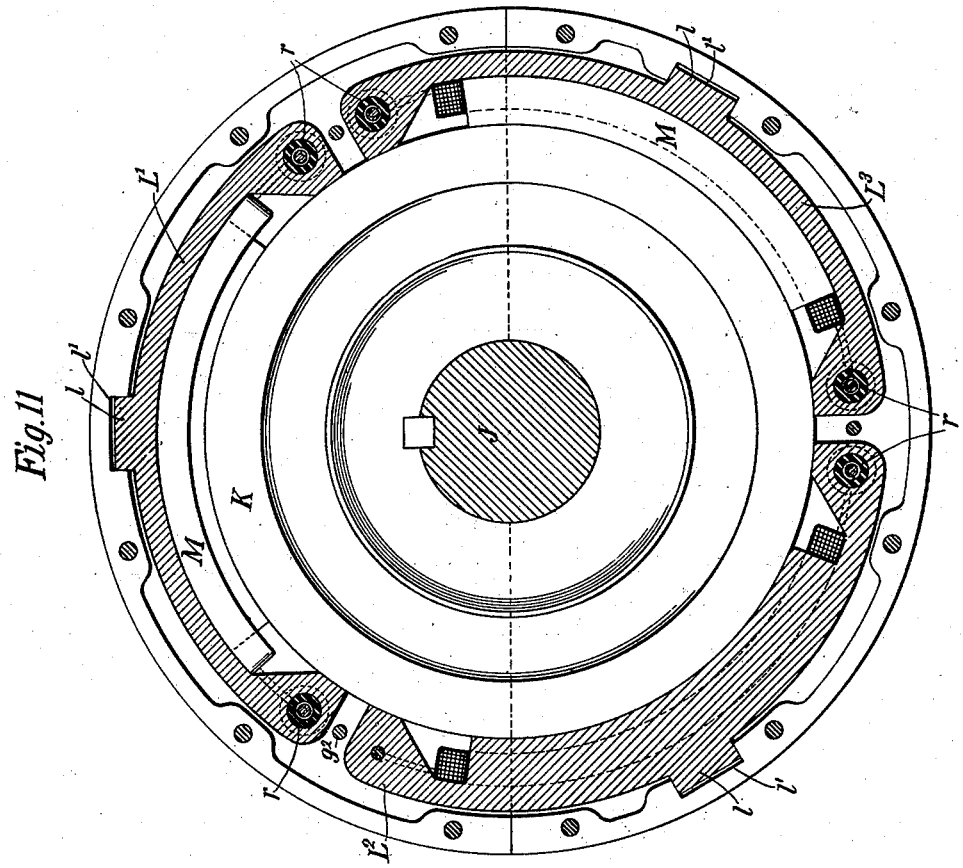
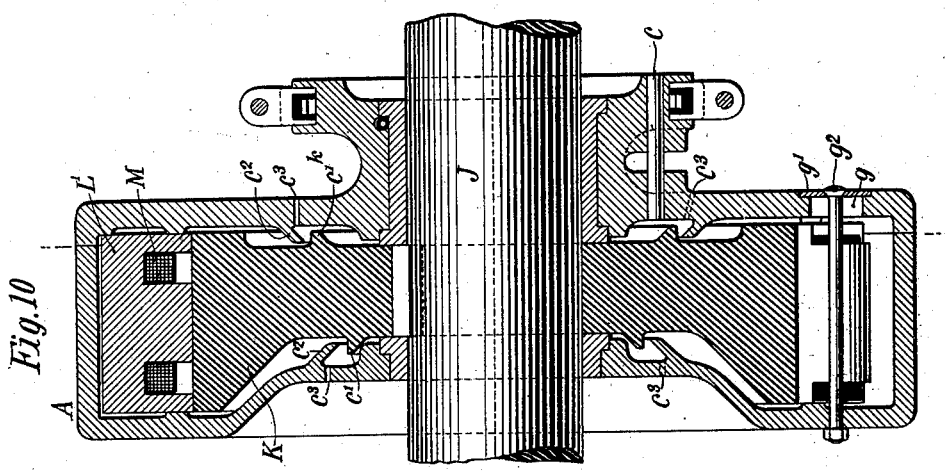
Witnesses: Raphaël Netter, C. D. Morrill
Inventor George C. Anthon by E. M. Bentley Att'y

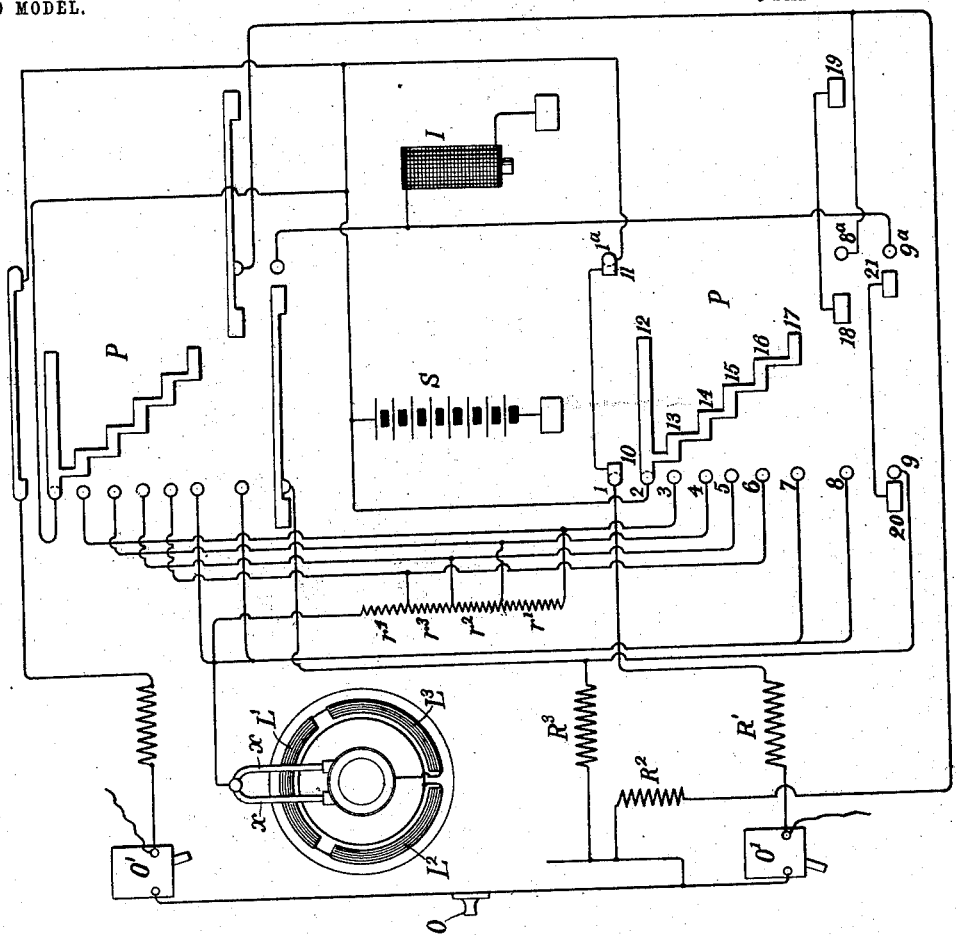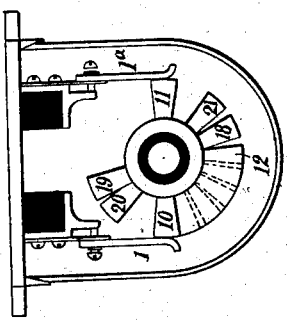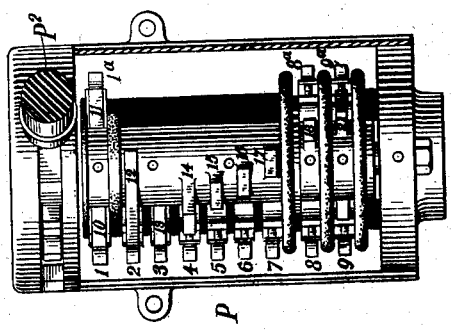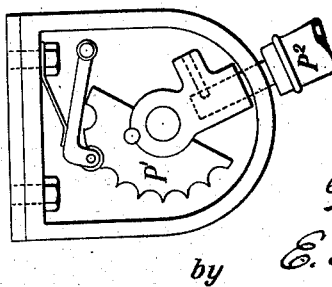

No. 750,422. Patented January 26, 1904.

UNITED STATES PATENT OFFICE.

GEORGE C. ANTHON, OF MEDFORD, MASSACHUSETTS, ASSIGNOR, BY MESNE ASSIGNMENTS, TO ALGONQUIN ELECTRIC BRAKE CORPORATION, OF BOSTON, MASSACHUSETTS, A CORPORATION OF MAINE.

ELECTRIC BRAKE.

SPECIFICATION forming part of Letters Patent No. 750,422, dated January 26, 1904.

Application filed April 11, 1902. Serial No. 102,365. (No model.)

*To all whom it may concern:*

Be it known that I, GEORGE C. ANTHON, a citizen of the United States, residing at Medford, county of Middlesex, State of Massachusetts, have invented certain new and useful Improvements in Electric Brakes, of which the following is a specification, reference being made to the accompanying drawings, wherein—

Figure 1 is a plan of a car equipped with my improved brake. Fig. 2 is a vertical section of a portion of the truck and car framework. Fig. 3 is a detail of the brake-lever suspension. Fig. 4, 5, and 6 are respectively sections of the locking-cylinder, showing the valve and operating-magnet therefor. Figs. 7, 8, 9, 10, and 11 illustrate the improvement in the winding-drum and clutch. Figs. 12, 13, 14, and 15 illustrate the controller and circuits therefor.

In a system of electric brakes heretofore devised by me I have employed a winding-drum for applying the brakes to the wheels, which is arranged to be clutched magnetically to one of the car-axles. For locking the brake automatically after its application and then releasing it wholly or partly at the will of the operator I have provided a fluid lock controlled by an electromagnet, which in turn is governed by the operator. I also provided a controlling apparatus by which the magnetic clutch and the lock were electrically governed by current from the trolley or source of current-supply and in the event of an interruption of such supply by means of a storage battery.

My present invention involves certain improvements upon the apparatus aforesaid which serve to simplify and render more reliable both the construction and the operation of a braking apparatus similar in general character to that just described.

First. I have improved the fluid lock by employing a single by-pass tube communicating with each end of the main cylinder and containing valve mechanism operating automatically to check the liquid-flow in one direction and to control the liquid-flow in the opposite direction for regulating and releasing the brake.

Second. I have improved the winding-drum and the electromagnetic clutch therefor by providing simpler and more reliable means for establishing the electrical connection of the coils contained therein with the supply-circuit. I have also added a number of mechanical improvements in matters of detail.

Third. I have provided an improved form of controller for manipulating the circuits leading to the brake and lock magnets and have arranged to operate the brake-magnet by current from a storage battery instead of the line-current, while the reverse throw of the controller-handle to the "off" position brings the storage battery into connection with the line for maintaining its charge.

Fourth. I have also devised a number of detailed contrivances, which will be hereinafter described and claimed.

Turning to Fig. 1 of the drawings, A represents a winding-drum on one of the axles J of a truck, the said drum being connected with or disconnected from the axle by means of an electromagnetic clutch. D is the brake-lever, to which is attached a draw-bar and chain C, the chain being wound up by the drum A after passing over the pulley C'. The lever D is arranged to draw on the brakes by means of the bars $d$ $d'$, jointed thereto upon the opposite sides of its pivotal point. The lever D may also be operated manually in the usual manner by means of the draw-bars $d^2$ and $d^3$. F, Figs. 2, 3, 4, 5, and 6, is the cylinder of the fluid lock, in which travels a piston E, connected to piston-rod B, which passes through a stuffing-box $b$. In my former arrangement the rod B was jointed directly to the lever D; but in my present device the said rod travels longitudinally in a straight line, being guided at one end by its bearings in the cylinder and at the other end by the rollers $b^3$. Between the rod B and the lever D is a thrust-link $b^2$, jointed to the rod at one end and to the lever D at the other end. In its normal position with the brakes released this link $b^2$ stands at a slight angle to the rod B; but as the brakes are applied and the lever D is turned the said link pushes on the rod B, being in turn pushed by the lever D, and gradually assumes a position nearly coincident with a vertical longitudinal plane through the axis of the rod B. By this means the side thrust on the rod B is diminished as the pressure on the brakes increases, until finally it practically disappears entirely and only the longitudinal component of the thrust strain remains. It will be understood that the cylinder F is filled with oil or other suitable liquid and the supply thereof is maintained by means of the communicating reservoir $F^2$ directly above the cylinder and formed in one casting therewith. This reservoir not only maintains the supply of oil, but also prevents the air from being drawn in by the piston and trapped in such a way as to prevent the application or the release of the brakes. The two ends of the cylinder communicate with each other by means of a by-pass tube G, containing a valve for controlling the flow of the liquid therethrough. This valve may be considered as comprising two subvalves, one, H, being a check-valve admitting the flow of oil through pipe G in the direction of the arrow 6, while the other subvalve, $h$, is a counterbalanced valve responding only to the action of the controlling-magnet I. Thus as the rod B and piston E are drawn forward in the cylinder F on the application of the brakes the oil is free to flow from the forward end of the cylinder through the pipe G and through the subvalve H to the rear end of the cylinder; but a flow in the opposite direction is prevented by the check action of the valve. Hence the brakes are automatically locked by the pressure of the oil in the rear of the piston E and remain set at any point to which they have been applied by the winding up of the chain C. When, however, it is desired to release the brakes, the operator energizes the magnet I to the desired extent, which raises the core 12 and brings the rod 11, carried by the core, against the stem of the valve $h$ to operate it. According to the power of the magnet and the length of the time it is energized the valve $h$ will be opened and allow the oil to flow back into the forward end of the cylinder, and so relieve the pressure on the rear end of the piston. This releases the brakes, which are restored to their normal position by means of the spring D', applied directly to the lever D as closely as possible to its pivotal point. As shown in Fig. 3, the spring D' abuts at its right-hand end against a projection $d^4$ on the bracket $D^2$, in which the lever D is pivoted. A clevis $d^5$ embraces the lever D and is jointed thereto, while its rear end extends through the said projection $d^4$, thence through the spring D', which at its left-hand end abuts against a washer adjustably secured to the rear end of the clevis $d^5$ by a nut. This arrangement permits a long spring being employed which operates over a short percentage of its length and is hence more durable and reliable. Besides the magnet I the hand-wheel $I^2$, Fig. 4, may be employed to operate valve $h$ and release the brakes. Thus if the current-supply should be interrupted at a time when the brakes are applied they can be manually released by means of the said hand-wheel. The shaft of this hand-wheel extends through a stuffing-box $f'$ and carries at its end a screw-thread $f^2$, which fits into an opening in the lower end of the casing, which carries the core 12 and the magnet-coils. The hand-wheel is normally locked by a pin $f^3$, which drops into a hole in it and prevents its rotation.

Figure 7:
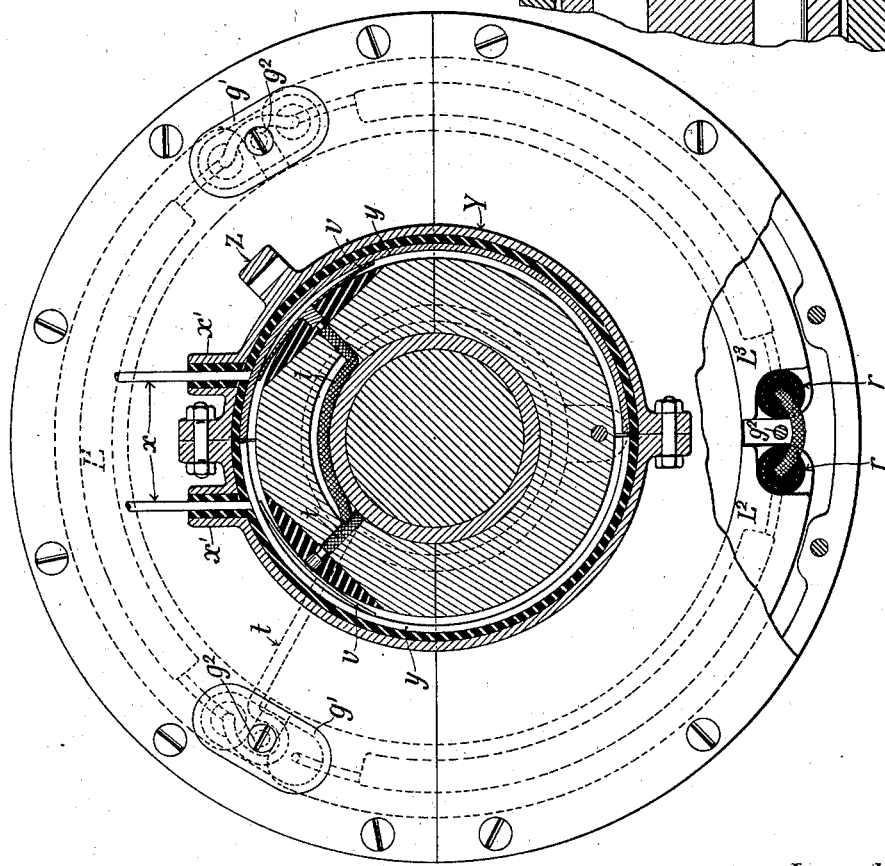

Turning next to the clutch and winding-drum, (shown in Figs. 7 to 11,) J is the car-axle. To this axle is keyed the disk K, which is of the shape in cross-section shown in Fig. 10, the object of this shape being to afford a sufficiently large surface for the application of the brake-shoes on its external periphery, while the drum is so dished or hollowed out within the periphery as to afford room for the hub of the driven wheel in order that the winding-drum may be placed on the axle between the hub of the wheel and the motor, which is also mounted on the same axle. The winding-drum A surrounds and incloses the disk K and is free to rotate on the axle J. A groove $k$, Figs. 8 and 10, on its inner side receives the chain C, the end of which is secured therein by a pin $c$. Outside of the disk K and within the winding-drum are three brake-shoes L', $L^2$, and $L^3$. These brake-shoes are curved to conform to the periphery of the disk K and to bear thereon. The exciting-coils M are embedded in the faces of the brake-shoes, as shown in Figs. 10 and 11. The center of the shoe is thus of one polarity, being embraced by the coil, while the edges are of the opposite polarity. The magnetic circuit is thus extremely short and the amount of metal is considerable, so that the coil M may be small and may also be energized by a small amount of current, such as may be more effectively supplied by the battery than by the line. On the back of each shoe is a lug $l$, which fits loosely into a recess $l'$ on the internal wall of the winding-drum. This arrangement is all that is required to secure the shoes in position and avoids the use of pivoted links or other devices for retaining them. They are held loosely by the projections and sockets aforesaid, the top shoe bearing upon the disk K and the other two being held away therefrom by gravity. The surface of the shoes are, however, in such proximity to the surface of the disk as to be readily attracted thereto when energized by the coils. On the opposite sides of the disk are oil-deflectors $c'$, and on the inside walls of the drum are corresponding deflectors $c^2$, which catch any oil thrown off by the deflectors $c'$ and deliver it to the outside of the drum through small ducts $c^3$. By this means no oil is permitted to reach the friction-surfaces. When the three brake-shoes are in position, as shown in Fig. 11, the two adjacent ends of each pair come opposite a small hand-hole $g$, Fig. 10. There are three such hand-holes or windows, as is indicated in Fig. 7, each one being covered by a plate $g'$, secured in position by a screw $g^2$. The coil-terminals on each shoe are brought to the respective extremities of the shoe and there connected to tubular sockets set in insulating-bushings $r$, and the sockets are connected together, as shown in Fig. 7, so as to connect the three shoes in series. The connecting-joint comes directly opposite one of the hand-holes, so that the shoes may be placed in position and the connection then made through the hand-hole, or the cover of the hand-hole may be at any time removed to inspect or disengage the connection. Preferably I employ the arrangement shown in Fig. 9, which shows a section through the adjacent extremities of the shoes $L^2$ and $L^3$. On each shoe the insulating-bushing $r$ contains the aforesaid tubular socket $r'$, to which the insulated outcoming wire $r^2$ from the coil is electrically connected. Two spring-plugs $s$, connected by an insulated wire, form a jumper for connecting the adjacent tubes $r'$, one of the spring-plugs being thrust into each tube and held therein by friction and also prevented by the cover of the hand-hole from escaping. If desired, the insulating-washer $r^3$, attached to the face of each plug, can be held in place by a screw $r^4$. The current will be introduced to this series of brake-shoe coils by a wire $t$, Figs. 7 and 8, which terminates in a spring-plug $s$ like those just described, entering the tube $r'$ at the left-hand extremity of the brake-shoe $L'$. The adjacent extremity of the shoe $L^2$ will have its terminal connected to ground through the metallic portion of the winding-drum. As appears in Fig. 8, the wire $t$ leads down through the wall of the winding-drum to a point on the side of the groove $k$ opposite to the wall of the drum, where, as appears in Fig. 7, it branches, and each branch is connected to a short spring contact-plate $v$, which bears against the inner surface of an insulated metallic ring $y$, seated in an internal groove within a stationary ring Y. Therefore as the drum rotates the said metallic ring $y$ will constantly bear against the contact-plate $v$, which rotates with the drum. Two such plates $v$ are provided simply as a matter of precaution, since one alone would serve the purpose. The ring Y is prevented from rotating by the attachment of the lug Z thereon, Fig. 7, to any stationary part of the apparatus—as, for example, to a brace $Z^2$, Fig. 2. In my former arrangement I provided for this sliding connection a rotating ring on the winding-drum and an external stationary contact-point bearing thereon. I have, however, found it much preferable to employ a stationary ring and to make the spring-plates $v$ the traveling part, as above described. The stationary ring Y is split into two parts, which are bolted together, as shown in Fig. 7. The ring Y fits into an external groove in the periphery of the flange which forms the outside of the chain-groove $k$. An internal groove or channel is formed in the ring Y, in which is seated a similarly-shaped strip of fiber or other insulating material containing within its own internal groove or channel the aforesaid conducting-strip $y$. The strip $y$ is split like the ring Y. The current is conducted from the strip $y$ by wires $x$, Fig. 7, extending through insulated nipples $x'$ in the ring Y.

Coming next to the controller, (illustrated in Figs. 12 to 15,) O, Fig. 15, represents the trolley or source of the current-supply for the vehicle. From the trolley the circuit branches to each end of the car, where it goes first through the circuit-breaker O' and thence through the controller P, there being such a controller on each end of the car, one being a duplicate of the other. It is only necessary to describe one of such controllers, because they are not only alike, but are used alternately, since but one of the circuit-breakers O' is closed at a time—to wit, the one on the leading end of the vehicle. The controller is of the usual cylindrical type, there being on one side a vertical row of nine stationary contact-fingers, numbered 1 to 9, respectively, and on the other side three similar fingers $1^a$, $8^a$, and $9^a$, placed, respectively, opposite the fingers 1, 8, and 9. On the cylinder are the several contact-plates 10, (connected to a similar plate 11, diametrically opposite thereto,) 12, 13, 14, 15, 16, and 17, (all in electrical connection with one another,) also plates 18 and 20, connected, respectively, to diametrically opposite plates 19 and 21.

Referring to Fig. 15, the normal condition of the controller with the brakes released is shown therein. Assuming that the lower circuit-breaker O' is closed, the current from the trolley passes through the circuit-breaker and resistance R' to finger 1, thence to plate 10, to plate 11, to finger $1^a$, to battery S, and thence to ground. This charges the battery and maintains it charged, there being no other circuit closed at that time. To apply the brakes, the first movement of the controller interrupts the circuit just described and brings finger 3 into engagement with plate 13. The battery then discharges through a circuit starting from ground and passing through the battery to finger 2, going thence to plate 13, to finger 3, through the resistance-sections $r'$, $r^2$, $r^3$, and $r^4$ to the brake-clutch magnets $L^3$ $L'$ $L^2$, and thence to ground. This energizes the clutch, connects the winding-drum with the disk K on the axle, and so winds up the brake-chain. The further movement of the controller removes in succession from the circuit just described the resistance-sections $r'$, $r^2$, $r^3$, and $r^4$ by bringing the fingers 4, 5, 6, and 7 in succession into engagement with their respective plates 14, 15, 16, and 17. The last of these positions may be regarded as an emergency position, since the entire removal of the resistance allows the full power of the battery to be applied to the clutch-magnet; but in addition I provide one more position, which brings finger 8 into engagement with plate 18 and finger $8^a$ into engagement with plate 19. This throws the trolley-current into the brake-magnet through resistance $R^2$, finger $8^a$, plates 19 18, and finger 8. This is a further emergency device. It will be remembered that the brakes will be automatically locked in position with whatever degree of force they may have been applied, and so will remain set. To release them, the controller is turned in the opposite or reverse direction from its normal or zero position. This throws fingers 9 and $9^a$ into engagement with connected plates 20 and 21, and the trolley-current then flows into the releasing-magnet I through the resistance $R^3$, finger 9, plates 20 and 21, finger $9^a$, and after passing through the magnet goes to ground. By this means the brakes may be released as gradually or as rapidly as is desired. This controller can be made small and compact, being in practice but five inches deep and about four inches wide. It is provided with a star-wheel $P'$, attached to the cylinder-shaft, which is operated by the handle $P^2$.

What I claim as new, and desire to secure by Letters Patent, is—

1. In a fluid-lock for an electric brake the combination with a cylinder and piston, of a by-pass tube connecting the opposite ends of said cylinder and means for controlling the flow of liquid in the said tube comprising an automatic check-valve and a control-valve and an electromagnet for operating the control-valve.

2. In a fluid-lock for electric braking apparatus the combination with a piston and cylinder of a by-pass tube connecting the opposite ends of said cylinder, an automatic check-valve, a controlling-valve balanced by pressure on opposite sides thereof and a magnet for operating said controlling-valve.

3. In a fluid-lock for braking apparatus the combination with a piston and cylinder, of a reservoir formed in one with the said cylinders, and a by-pass tube and operating-magnet therefor both supported on the cylinder.

4. In a magnetic clutch, the combination with a brake-disk, of an external drum, intermediate brake-shoes bearing upon the periphery of the said disk and loosely engaging the interior of the said drum, and coils for energizing the brake-shoes embedded therein.

5. In a magnetic clutch, the combination with a brake-disk of an external drum, intermediate brake-shoes bearing upon the periphery of the disk and engaging the drum, and oil-deflecting devices for preventing the access of oil to the friction-surfaces.

6. In a magnetic clutch, the combination with a brake-disk of an external drum, intermediate brake-shoes bearing upon the periphery of the disk, coils on the said brake-shoes, and electrical connecting devices between the terminals of adjacent coils, the said connecting devices being located opposite to openings or hand-holes in the wall of the said drum.

7. The combination with an electromagnetic brake-shoe of terminal connections for the coils thereon comprising an insulated socket and a plug adapted to enter the said socket.

8. The combination with two adjacent electromagnetic brake-shoes, of insulated terminal sockets on each shoe and a jumper for connecting the coils of the two shoes provided with plugs at its opposite ends adapted to enter the said sockets.

9. An electromagnetic brake-shoe having an insulating-coil thereon, and contact-terminals for the coil in the form of insulated sockets adapted to receive a connecting-plug.

10. The combination in an electromagnetic clutch of a brake-disk, an inclosing drum, an intermediate brake-shoe bearing upon the periphery of the disk and a lug projecting from the rear of said brake-shoe and loosely engaging a socket on the inner wall of the said drum.

11. In an electric brake apparatus, the combination with a winding-drum, of a brake-disk, magnetic clutching devices having one coil-terminal connected with a contact-point rotating with the drum and a stationary contact-ring engaging the said contact-point.

12. The combination with a rotating magnetic clutch, of a stationary contact-ring, and a spring contact-plate rotating with the clutch and forming the terminal of the exciting-coil of the clutch.

13. The combination with a rotating magnetic clutch containing exciting-coils, of a stationary contact-ring, external insulation therefor, a ring protecting the said insulation and a spring contact device rotating with the said drum and bearing upon the inner surface of the said stationary ring.

14. The combination with a rotating magnetic clutch of exciting-coils therefor, two branch terminals for the said coil, rotating with the clutch and a stationary contact engaging with both of the said terminals.

15. In an electrically-propelled vehicle supplied with current from a line-wire the combination with an electric translating device on the vehicle, of a storage battery in shunt to the motor and a controlling-switch for connecting the battery to said translating device and to the line-wire alternately comprising contacts connected to said battery, translating device and line-wire respectively.

16. In an electrically-propelled vehicle supplied with current from a line-wire, the combination with an electromagnetic brake on the vehicle, of a storage battery in shunt to the motor and a controlling-switch for connecting the battery to said brake and to the line-wire alternately comprising contacts connected to said battery, brake and line-wire respectively.

17. In an electrically-propelled vehicle supplied with current from a line-wire, the combination with an axle of a disk thereon, a winding-drum, an electromagnetic clutch, a storage battery in shunt to the motor and a controlling-switch for connecting the battery to said clutch and to the line-wire alternately comprising contacts connected to said battery, clutch and line-wire respectively.

18. In an electrically-propelled vehicle supplied with current from a line-wire, the combination with the brakes thereof, of a disk on the axle, a winding-drum, a brake-shoe for clutching the drum to the said disk, an energizing-coil embedded in said shoe, a storage battery in shunt to the motor, a controller for connecting the said battery to the said coil and means for charging the battery from the line-wire.

19. In an electrically-propelled vehicle supplied with current from a line-wire, the combination with the brakes, of a winding-drum therefor, an electromagnetic clutch for engaging the said drum with the axle, a storage battery in shunt to the motor, a controller for connecting the battery to the said clutch, regulating resistances operated by the said controller and means for charging the battery from the line-wire.

20. In an electrically-propelled vehicle supplied with current from a line-wire, the combination with an electromagnetic brake, of a storage battery in shunt to the motor, a regulating-controller between the battery and the brakes and means for charging the battery from the line-wire.

21. In an electrically-propelled vehicle supplied with current from a line-wire, the combination with an electromagnetic brake, of a storage battery, a regulating-controller for applying the battery to the brakes and contacts on the controller for admitting the line-current to the brakes at will.

22. In an electrically-propelled vehicle supplied with current from a line-wire, the combination with electromagnetic brakes, of a storage battery normally connected to the line-wire in shunt to the motor, a regulating-controller for connecting the battery to the brakes and circuit-breaking contacts thereon for disconnecting the battery from the line-wire.

23. In an electrically-propelled vehicle supplied by current from a line-wire, the combination with an electromagnetic brake, of a storage battery normally connected to the line-wire, a regulating-controller for connecting the battery to the brake, circuit-breaking contacts thereon for disconnecting the battery from the line-wire and additional contacts for connecting the line-wire directly to the brake.

24. In an electrically-propelled vehicle supplied with current from a line-wire, the combination with the brakes, of a winding-drum, brake-shoes for connecting the drum to the axle, energizing-coils embedded in said shoes, a regulating resistance, a controller and a storage battery in shunt to the motor but adapted to be connected to the said coils by means of the controller and means for charging the battery from the line-wire.

25. In an electrically-propelled vehicle supplied with current from a line-wire, the combination with an electromagnetic brake, of an automatic lock therefor, a storage battery, a controller for applying the battery to the brake, a release-magnet, controller-contacts for energizing the said release-magnet from the line-wire and means for charging the battery from the said line-wire.

26. In an electrically-propelled vehicle supplied with current from a line-wire, the combination with electromagnetic brakes, of a storage battery normally connected to the line and a controller comprising contacts operated by a forward movement thereof to connect the battery to the brakes and disconnect it from the line and contacts operated by a reverse movement of the controller for energizing a brake-releasing magnet.

27. In an electric-railway vehicle supplied with current from a line-wire, the combination with an electromagnetic brake, of a fluid-lock therefor, an automatic check-valve for retaining the brake, a releasing-valve and operating-magnet therefor, a storage battery charged from the line-wire and a controller comprising contacts operated by one direction of movement thereof to apply the battery to the brake and contacts operated by a different movement thereof to operate the release-magnet.

28. In an electrically-propelled vehicle supplied with current from a line-wire, the combination with an electromagnetic brake, of a storage battery normally connected to the line-wire in series with the resistance and a controller comprising contacts for connecting the battery to the brake and contacts for disconnecting the battery from the line-wire at a point between the battery and the said resistance.

29. In an electrically-propelled vehicle supplied with current from a line-wire, the combination with electromagnetic brakes, of a storage battery charged by the line-wire in series with a resistance, a regulating-controller for applying the battery to the brakes, a release-magnet for the brakes, a resistance therefor and contacts on the controller for connecting the said magnet to the line-wire in series with the said resistance.

30. In an electrically-propelled vehicle supplied with current from the line-wire, the combination with the brakes, of a winding-drum therefor, an electromagnetic clutch, for engaging the drum with the axle, a storage battery charged from the line-wire in series with a resistance, a controller for connecting the battery to the clutch, regulating resistances in circuit with the battery and operated by said controller and a release-magnet governed by a separate movement of the said controller.

In witness whereof I have hereunto set my hand, before two subscribing witnesses, this 9th day of April, 1902.

GEORGE C. ANTHON.

Witnesses:
CHAS. T. GOODHUE,
JAMES D. TANNER.